(12) United States Patent
Funke et al.

(10) Patent No.: US 9,773,417 B2
(45) Date of Patent: Sep. 26, 2017

(54) ENHANCED PARK ASSIST SYSTEM

(71) Applicant: Ford Global Technologies, LLC, Dearborn, MI (US)

(72) Inventors: James Michael Funke, Ann Arbor, MI (US); Andrew E. Ochmanski, Sterling Heights, MI (US); Aric David Shaffer, Ypsilanti, MI (US); Vinit Singh, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/991,492

(22) Filed: Jan. 8, 2016

(65) Prior Publication Data
US 2017/0200373 A1 Jul. 13, 2017

(51) Int. Cl.
*G08G 1/16* (2006.01)
*G06K 9/00* (2006.01)
*B60W 30/06* (2006.01)
*G05D 1/00* (2006.01)

(52) U.S. Cl.
CPC ............. *G08G 1/168* (2013.01); *B60W 30/06* (2013.01); *G05D 1/0061* (2013.01); *G06K 9/00812* (2013.01); *B60W 2510/1005* (2013.01)

(58) Field of Classification Search
CPC .................................................... G08G 1/168
See application file for complete search history.

(56) References Cited

U.S. PATENT DOCUMENTS

| | | | |
|---|---|---|---|
| 8,542,130 B2 | 9/2013 | Lavoie | |
| 8,710,975 B2 | 4/2014 | Pampus et al. | |
| 9,120,425 B2* | 9/2015 | Tate, Jr. ............... | B62D 15/028 |
| 9,333,903 B2* | 5/2016 | Kim ....................... | B60Q 1/143 |
| 2005/0060073 A1* | 3/2005 | Tanaka ............... | B62D 15/0285 701/36 |
| 2009/0259365 A1* | 10/2009 | Rohlfs ................. | B62D 15/028 701/41 |
| 2010/0332080 A1* | 12/2010 | Bae ...................... | B62D 15/028 701/42 |
| 2011/0273310 A1* | 11/2011 | Kadowaki .......... | B62D 15/0285 340/932.2 |
| 2011/0298639 A1* | 12/2011 | Kadowaki ............ | B62D 15/027 340/932.2 |
| 2015/0127222 A1 | 5/2015 | Cunningham, III et al. | |

FOREIGN PATENT DOCUMENTS

DE 102007029773 A1 12/2008

* cited by examiner

*Primary Examiner* — Adam Tissot
*Assistant Examiner* — Michael Berns
(74) *Attorney, Agent, or Firm* — Frank MacKenzie; Brooks Kushman, P.C.

(57) ABSTRACT

A vehicle park assist system may include a sensor, a signal device, and a controller configured to locate via the sensors an available parking place and activate the signal device in response to locating the available parking place and recognizing a park trigger indicative of a desire to park in the available parking place upon passing the available parking place.

20 Claims, 15 Drawing Sheets

ENHANCED PARK ASSIST SYSTEM

TECHNICAL FIELD

Disclosed herein are enhanced park assist systems.

BACKGROUND

Parking guides and parking assist features are becoming increasingly prevalent in vehicles. Vehicle cameras and sensors are often used to display relevant vehicle views to aid the driver in parking the vehicle. Furthermore, some vehicles include self-park capabilities.

SUMMARY

A vehicle park assist system may include a sensor, a signal device, and a controller configured to locate via the sensors an available parking place and activate the signal device in response to locating the available parking place and recognizing a park trigger indicative of a desire to park in the available parking place upon passing the available parking place.

A vehicle park assist system may include a sensor, a signal device, and a controller configured to activate the signal device during park assist and deactivate the signal device in response to receiving vehicle component data including a cease signal trigger indicative of the park assist being substantially complete and including at least one of a vehicle wheel alignment and vehicle gear.

A vehicle park assist system may include at least one sensor, at least one signal device on each side of a vehicle, and a controller configured to locate, via the sensor, an available parking place, activate, in response to locating the available parking place and recognizing a park trigger indicative of a desire to park in the available parking place upon passing the available parking place, the signal device, and deactivate the signal device in response to receiving vehicle component data indicative of a least one cease signal trigger.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein are park assist systems for activating and deactivating a vehicle blinker during the operation of a vehicle's active park assist. During park assist searching, the park assist system may identify an available parking place. In response to the vehicle gear being placed into reverse, or in response to the vehicle slowing down, the system may enable the vehicle blinkers and hold the blinker active until the vehicle is substantially within the parking place. By enabling and disabling the blinker based on vehicle events, transparency and awareness to the driver's intentions to the surrounding public and traffic, as well as user satisfaction, will be realized.

Figure 1A:
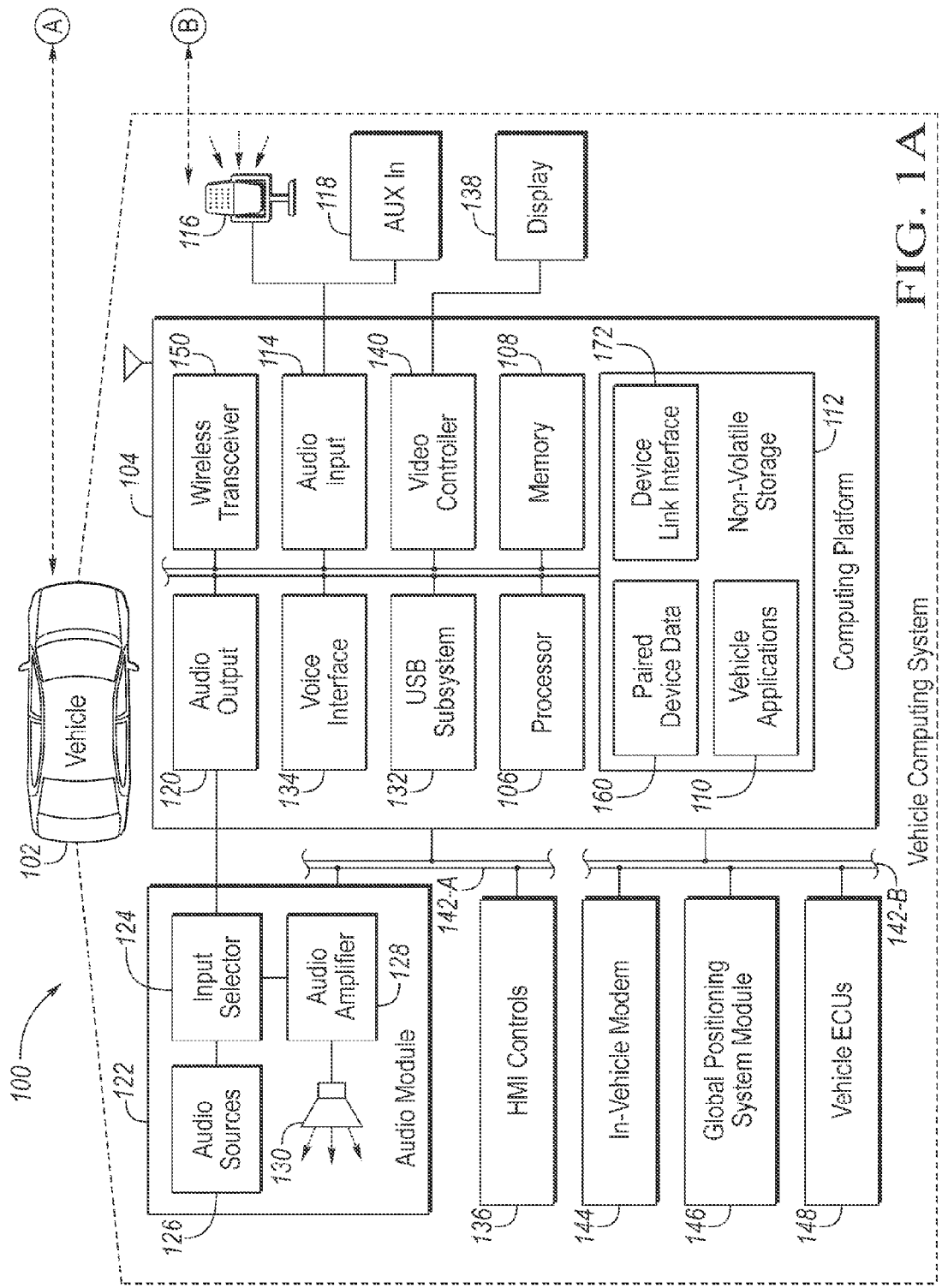
FIGS. 1A and 1B illustrate an example diagram of a system that may be used to provide telematics services to a vehicle.
Figure 1B:
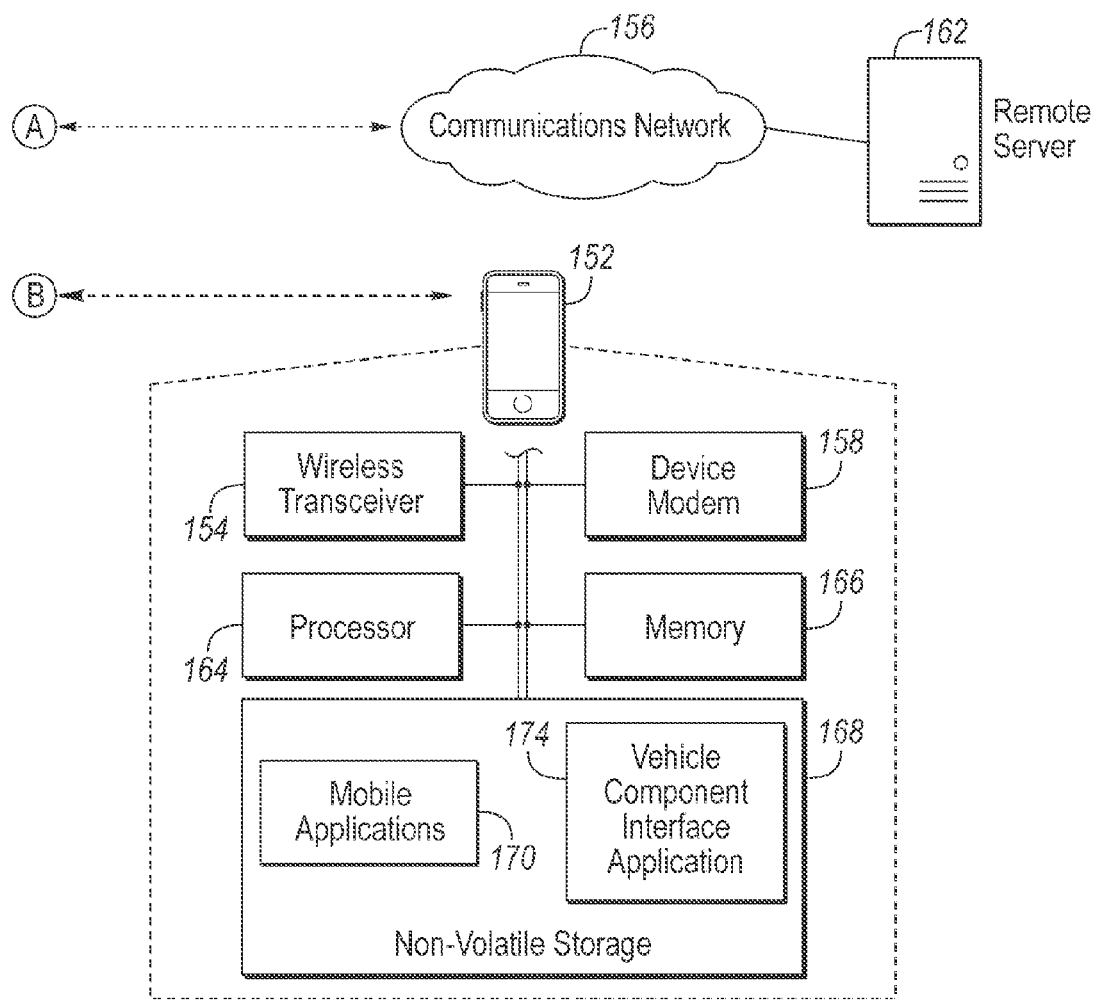

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 and controllers configured to perform instructions, commands and other routines in support of the processes described herein. For instance, the computing platform 104 may be configured to execute instructions of vehicle applications 110 to provide features such as navigation, accident reporting, satellite radio decoding, hands-free calling and parking assistance. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

Figure 2:
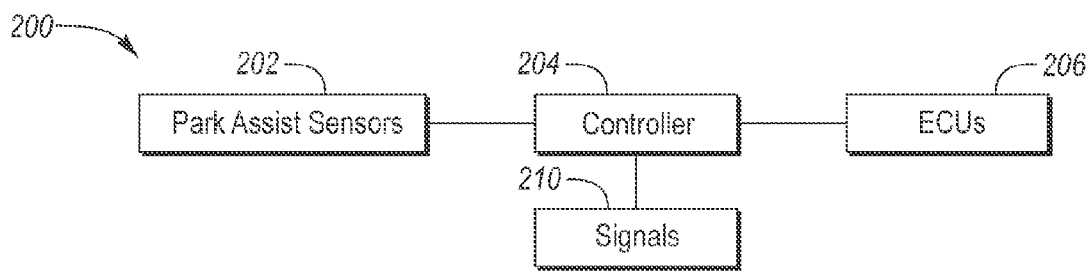
FIG. 2 illustrates an example block diagram of a park assist system.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.), and other sensors such as sensors 202, as shown in FIG. 2, etc.

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The communications network 156 may provide communication services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the ANDROID AUTO protocol provided by Google, Inc. of Mountain View, Calif. The vehicle component interface application 174 may be one such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case such the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As explained in detail below, an appropriate mobile device 152 to display the vehicle component interface application 174 may be identified (e.g., mobile display 176), and a definition of the user interface to display may be provided to the identified vehicle component interface application 174 for display to the user.

Systems such as the system 100 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device to have been paired with or be in communication with the computing platform 104.

FIG. 2 illustrates an example block diagram of a park assist system 200. The system 200 may be configured as part of computing platform 104. The park assist system 200 may also be a standalone system, or configured as part of mobile device 152 and/or remote server 162. The park assist system 200 may include at least one sensor 202 configured to detect distances of objects external to the vehicle 102. The sensors 202 may be sensors typically used by park assist features that are configured to provide data which is in turn used to aid a user or driver in parking a vehicle. The sensors 202 may be ultrasonic sensors, infrared sensors, laser sensors, optical sensors, etc. The sensors 202 may additionally provide data that may be interpreted to indicate an available parking place by the controller 204.

The sensors 202 may also include one or more cameras capable of imaging areas around the vehicle 102. As the camera images certain areas while the vehicle 102 is driving, the computing platform 104 may recognize certain available parking places by analyzing various image frames. The camera images may also provide dimensions of available parking places, among other attributes.

The park assist system 200 may include a controller 204 having a processor and a memory for carrying out certain processes and instructions described herein. Although shown as a separate component, the controller 204 may be within or part of the computing platform 104. Similarly, a database (not shown) may be maintained within the computer-readable medium 112, which may also participate in providing instructions and other data that may be read by the processor 106 of the computing platform 104.

The park assist system 200 may include various vehicle signals 210. The vehicle signals 210 may include exterior signals such as blinkers, mirror lights, tail lights, head lights, etc. The controller 204 may be configured to activate the various signals in response to certain conditions occurring. For example, upon realizing that the vehicle 102 is beginning to park, the controller 204 may activate the blinker on the side of the car adjacent to the parking place. This process is described in more detail below.

The park assist system 200 may include various vehicle ECUs 148, as discussed above with respect to FIG. 1A. The ECUs 148 may provide component data to the controller 204 indicative of certain vehicle component statuses such as transmission gear (park, neutral, drive, reverse, etc.), brake status, steering wheel position, vehicle wheel alignment/position, and/or vehicle speed, among others. The controller 204 may use the component data to determine when to activate and deactivate the signals 210. For example, upon a slowing of the vehicle after the vehicle passes an available parking place, the controller 204 may activate the signals 210 at least because the deceleration of the vehicle 102 may indicate that the driver wishes to park in the available parking place. In another example, upon receiving an indication from the vehicle ECUs 148 that the transmission gear changes from reverse to drive (or forward), the controller 204 may deactivate the signals 210 at least because the change in gear indicates that the vehicle 102 is substantially finished parking.

The controller 204, as explained, may manage and control various vehicle components during park assist features. This may include controlling a vehicle steering wheel, wheel speed, wheel position, operation of the vehicle powertrain and brakes, etc. The controller 204 may control various vehicle components based on a park assist feature. The various park assist features may include active park assist features such as a semi-automatic parallel parking (SAPP) feature and a perpendicular park assist (PPA) feature, as well as a park-out assist (POA) feature, among others. In each of these features, the controller 204 may control (e.g., activate and deactivate) the vehicle signals 210 based on feedback from the various sensors 202 and vehicle ECU's.

The controller 204 may be configured to activate the signals 210 in response to recognizing an available parking place and at least one park trigger event (also referred to herein as park trigger). A park trigger event may be an event that indicates that the vehicle 102 is likely to park in the recently recognized available parking place. In one example, the park trigger event may be a slowing of the vehicle below a predefined speed (e.g., below 20 MPH). Another example may be a depression of the vehicle break upon passing the available parking place. Such park trigger events may be recognized based on the component data from the vehicle ECUs 148, as explained above. By activating the signals 210 during use of park assist features, the vehicle 102 may alert other drivers as to the vehicle's intent to park in a certain available parking place. Furthermore, user distraction is decreased or eliminated by the automatic activation of the signals 210 upon realizing that the vehicle 102 is actively parking.

In another implementation, the controller 204 may be configured to deactivate the signals 210 in response to recognizing a cease signal trigger event (also referred to herein as a cease signal trigger). A cease signal trigger event may be an event that indicates that the vehicle 102 has substantially completed its current parking maneuver. In one example, the cease signal trigger event may include placing the vehicle into park. In another example, the cease trigger signal event may include the vehicle 102 shifting to forward during the active park assist, the vehicle 102 coming to a complete stop, the vehicle traveling a predefined distance (during the POA feature), and the vehicle wheels becoming completely straight and parallel with the vehicle to indicate that a turn is complete, etc. Upon recognizing one of these triggers by way of the vehicle component data, the controller 204 may deactivate the signals 210. Again, user distraction is decreased by the automatic deactivation of the signals 210 in response to a realization that the parking maneuver is complete or near complete.

FIGS. 3A-5D illustrate example parking scenarios for the park assist system 200 in the various feature types.

Figure 3A:
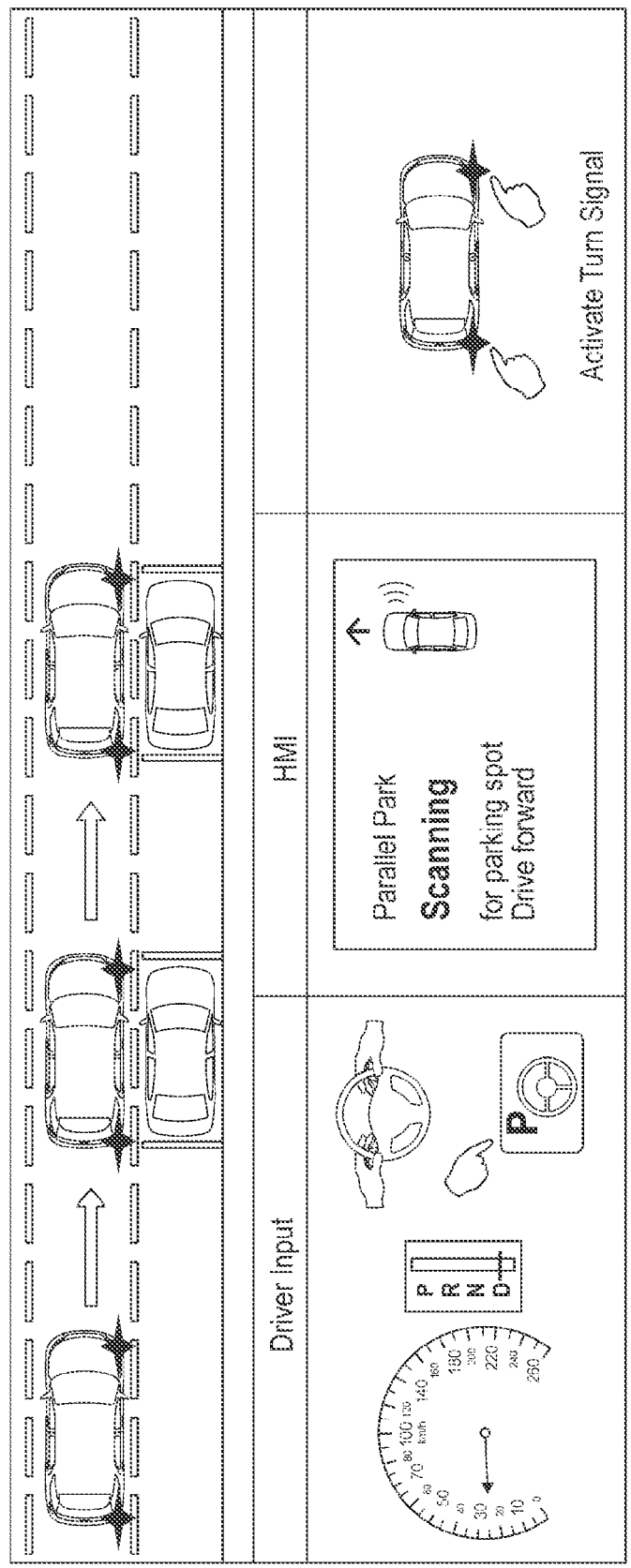
FIGS. 3A-3D illustrate example parking scenarios for the park assist system.

FIGS. 3A-3D illustrate example parking scenarios during SAPP. During SAPP, the vehicle 102 may search for an available parallel parking place. Upon detecting an available parking place, the controller 204 may activate the signal 210 on the side of the vehicle 102 adjacent to the parking place, as shown in FIG. 3A.

Figure 3B:
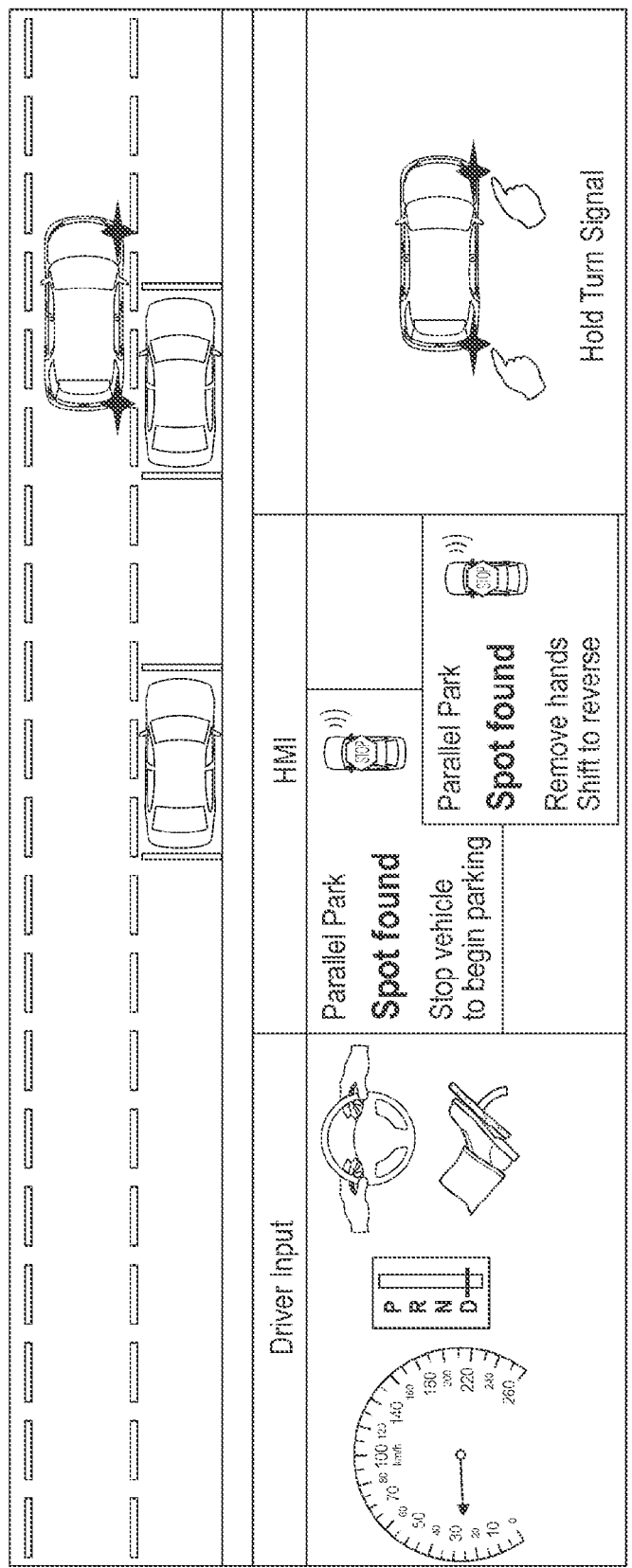

Referring to FIG. 3B, once a parking place is located, the controller 204 may wait for a park trigger event to occur to realize that the driver wishes to park in the available parking place. This park trigger event may include one of any number of driver actions, such as pressing the vehicle brake upon passing the parking place. Other park trigger events may include a selection of a park assist button on the vehicle display 138. As the vehicle slows down, it may be beneficial to alert other drivers as to the driver's intent. The controller 204 may thus instruct the signal 210 to activate while the vehicle is slowed in an effort to alert the other drivers that the vehicle 102 will be parking in the available parking place.

Figure 3C:
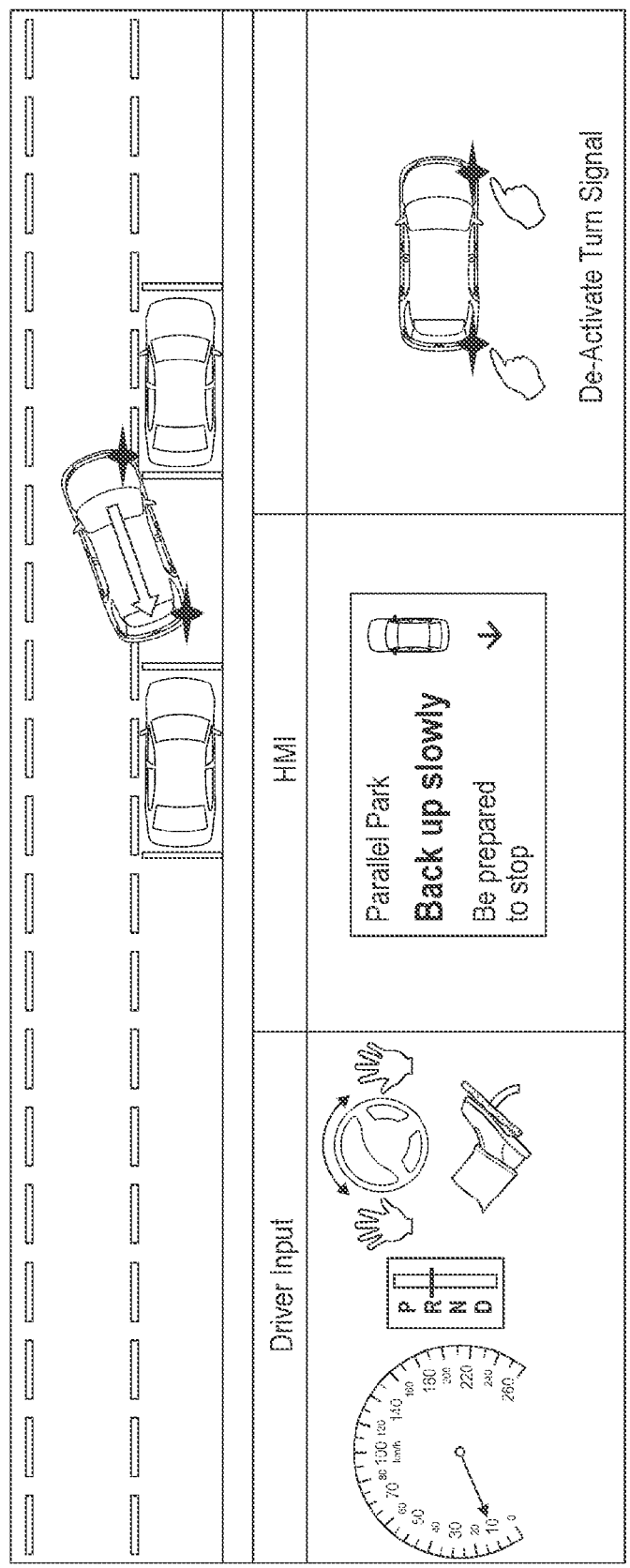

Referring to FIG. 3C, during the active park assist, a driver's hands may be free from the steering wheel. The driver may maintain control of the vehicle brake. During the active park assist, the vehicle signals 210 may remain active.

Figure 3D:
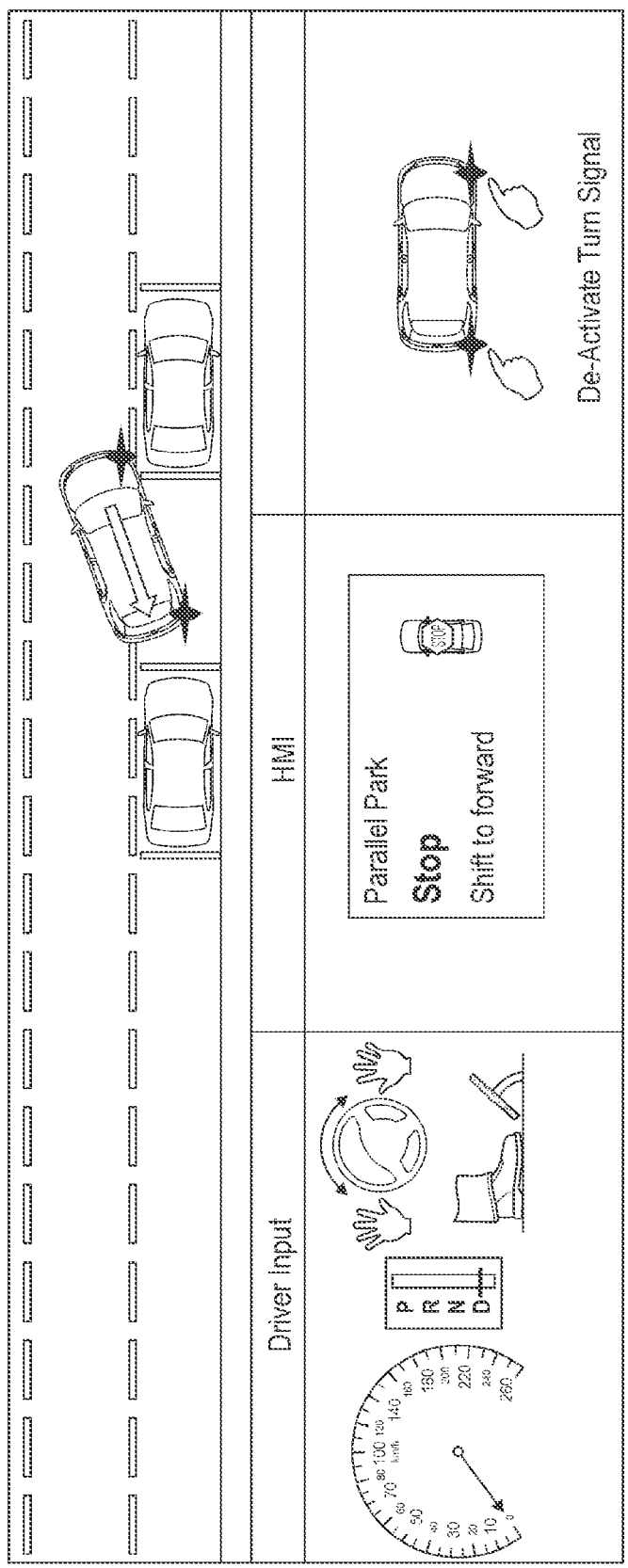

Referring to FIG. 3D, once the vehicle 102 is mostly within the parking place, that is, at least one end (e.g., the rear) of the vehicle 102 is within the parking place, the controller 204 may deactivate the signals 210. The controller 204 may deactivate the signals 210 in response to a cease signal trigger event such as the vehicle 102 coming to a complete stop during the active park assist, and the vehicle shifting to forward during the active park assist, among others.

Figure 4A:
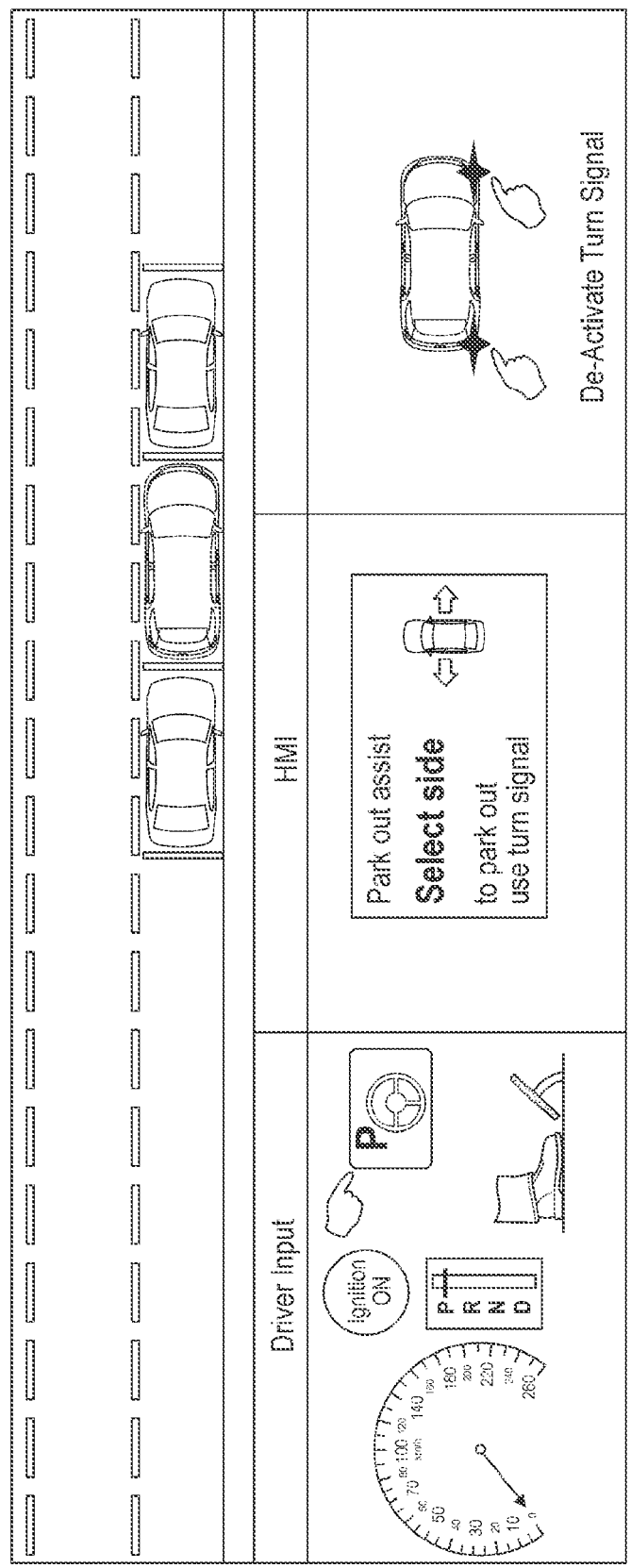
FIGS. 4A-4D illustrate example parking scenarios for the park assist system.
Figure 4B:
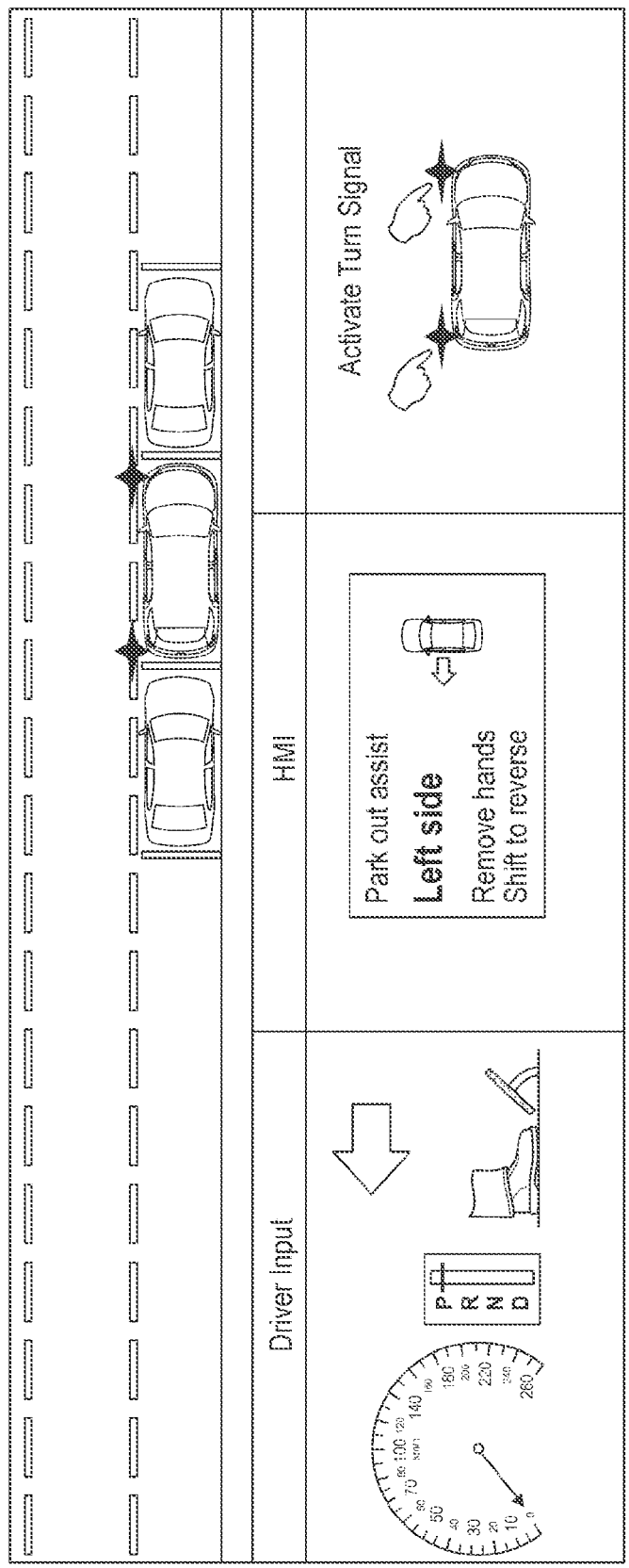
Figure 4C:
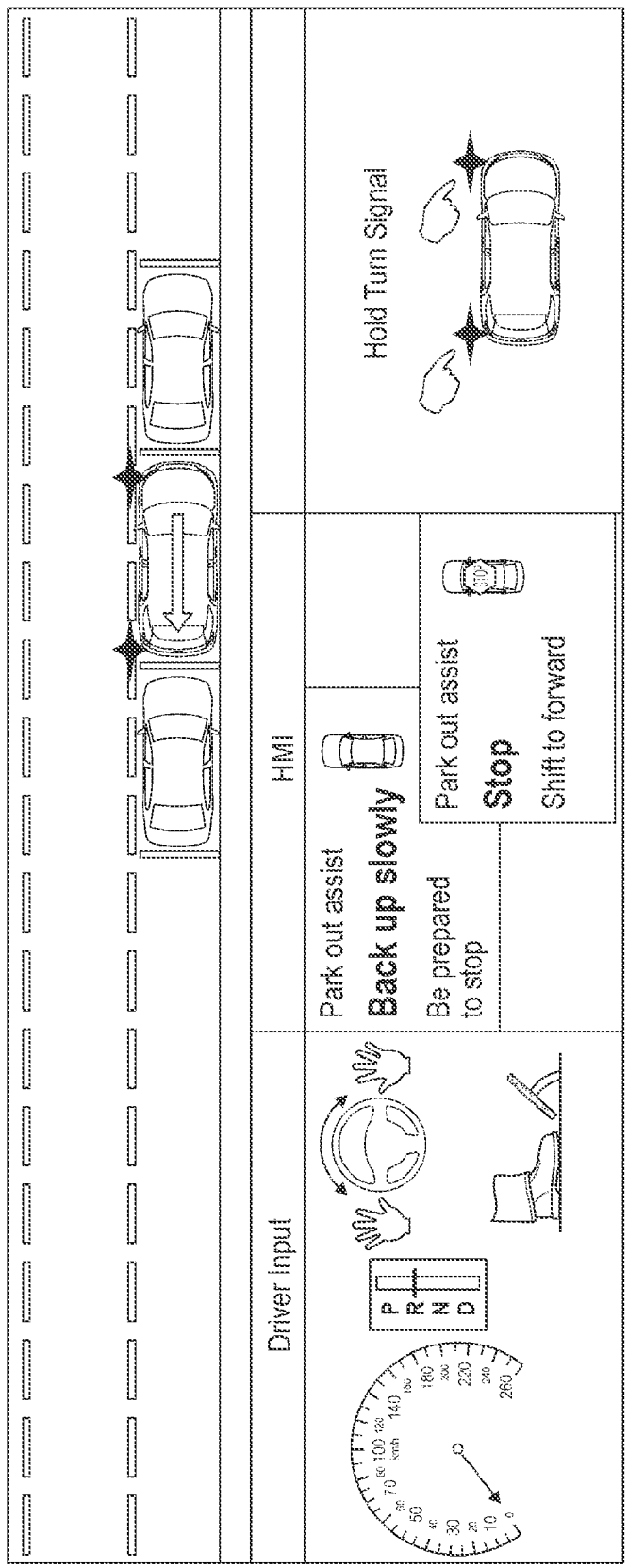
Figure 4D:
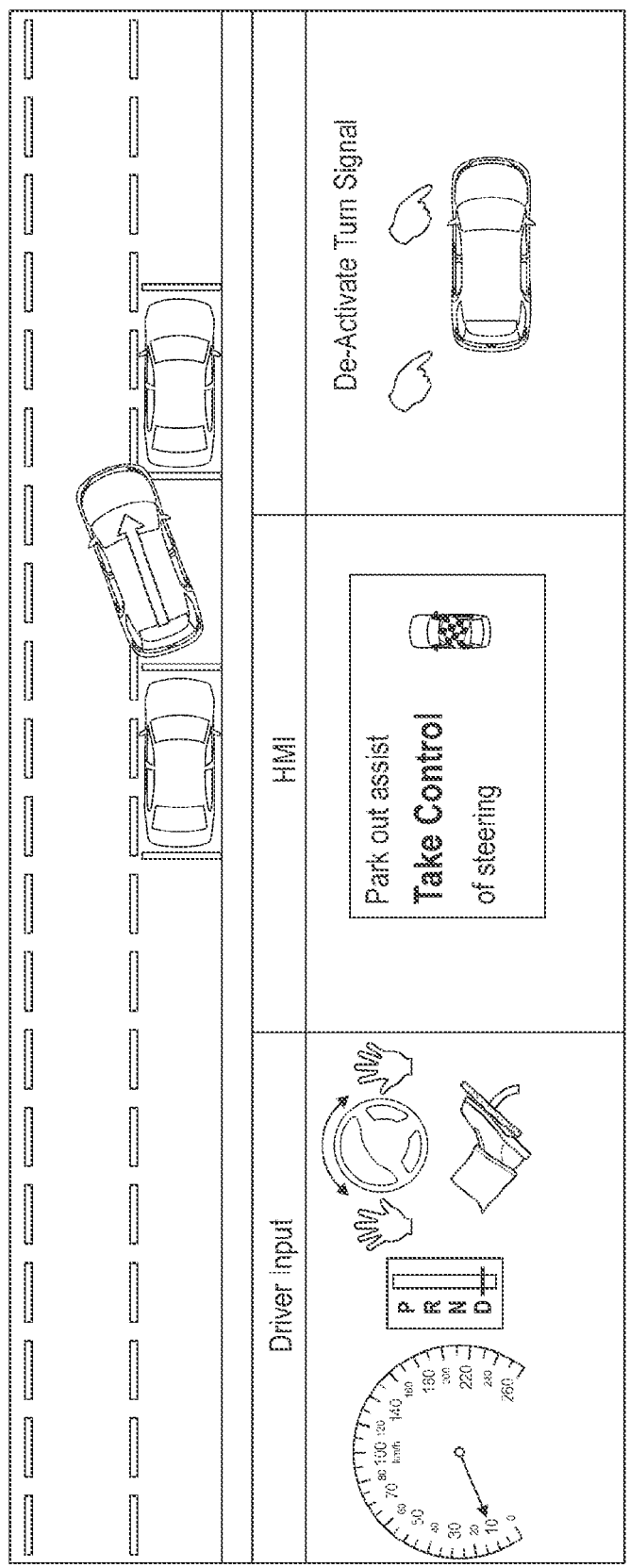

FIGS. 4A-4D illustrate example parking scenarios during POA. Referring to FIG. 4A, during POA, the vehicle 102 may be configured to pull-out (or park-out) of a parking place. POA may be initiated in response to driver activation. Referring to FIG. 4B, once POA is initiated, the controller 204 may activate the signals 210 on the side of the vehicle 102 facing traffic. Additionally or alternatively, the driver may manually activate the signals 210. Referring to FIG. 4C, the signals 210 may continue to be activated during the POA maneuvers (e.g., backing up, pulling forward, etc.). Referring to FIG. 4D, the controller 204 may deactivate the signals 210 in response to a cease signal trigger event such as the vehicle having traveled a predefined distance from the parking place. The predefined distance may be approximately 10 yards.

Figure 5A:
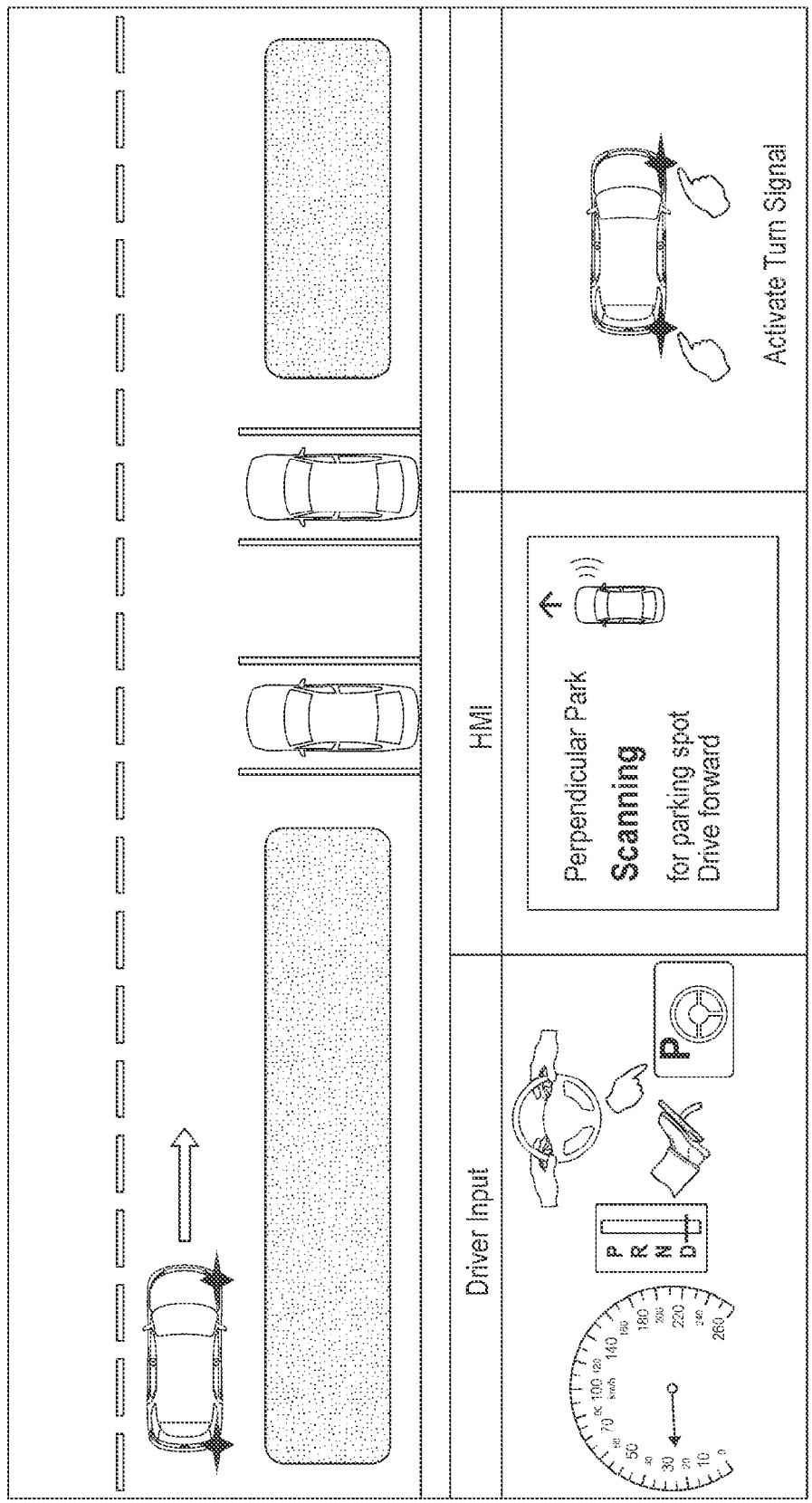
FIGS. 5A-5D illustrate example parking scenarios for the park assist system.

FIGS. 5A-5D illustrate example parking scenarios during PPA. Referring to FIG. 5A, during PPA, the vehicle 102 may search for an available perpendicular parking place. Upon detecting an available parking place, the controller 204 may activate the signal 210 on the side of the vehicle 102 adjacent to the parking place.

Figure 5B:
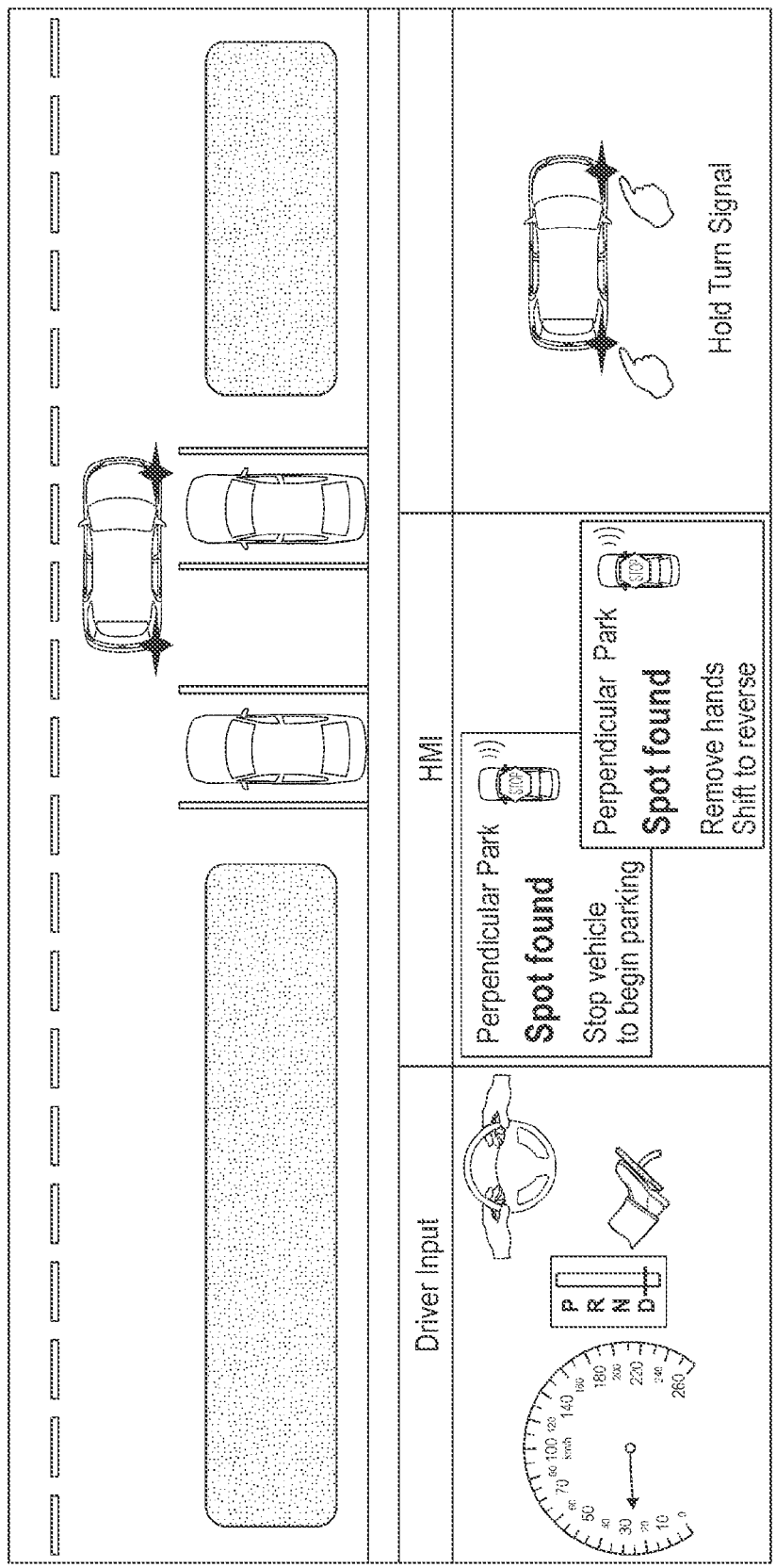

Referring to FIG. 5B, once a parking place is located, the controller 204 may wait for a park trigger event to occur to realize that the driver wishes to park in the available parking place. The park trigger event may include one of any number of driver actions, such as pressing the vehicle brake. As the vehicle 102 slows down, the controller 204 may activate the signals 210 in order to alert other drivers that the vehicle 102 will be parking in the available parking place.

Figure 5C:
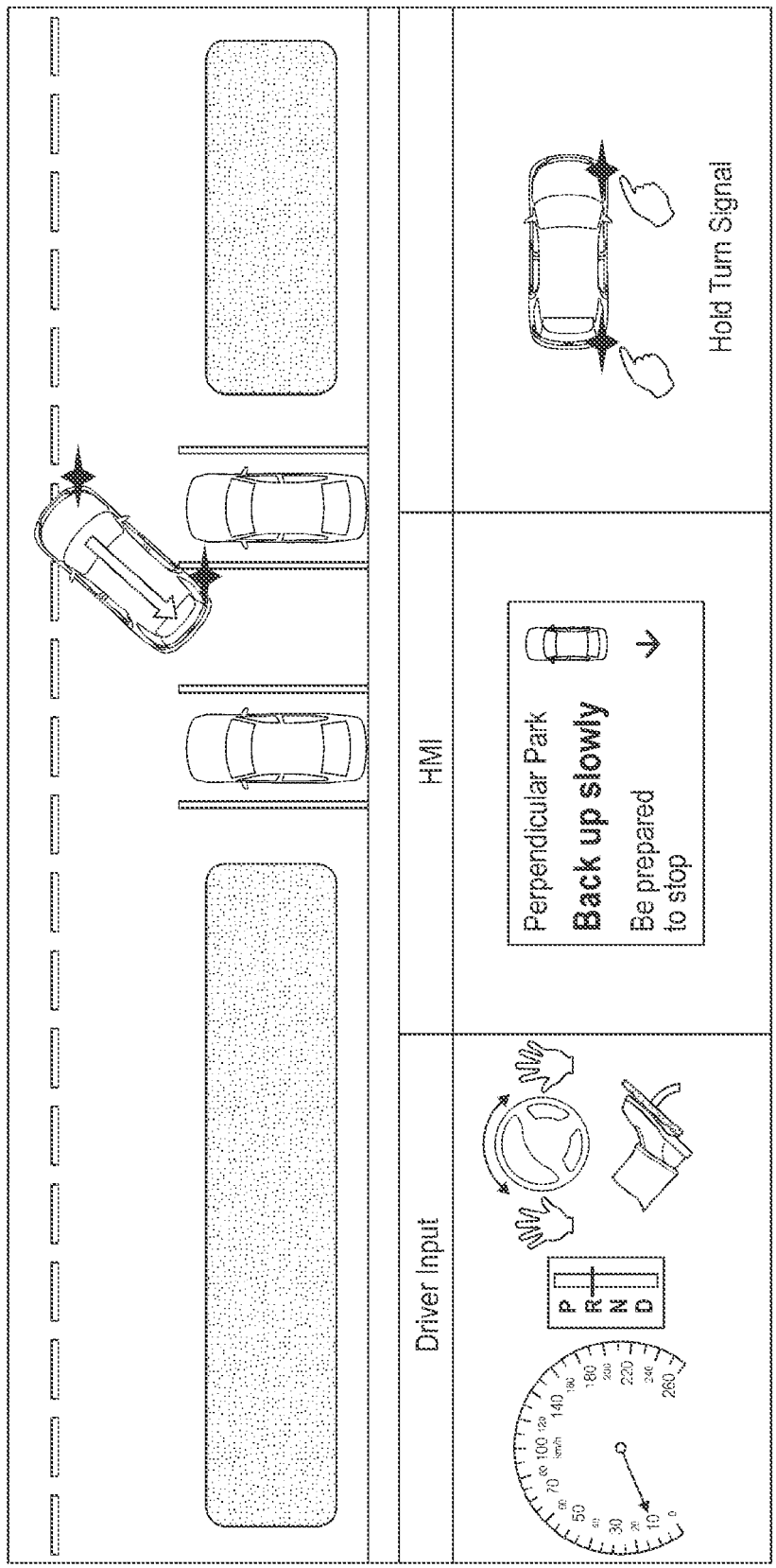

Referring to FIG. 5C, during the active park assist, a driver's hand may be free from the steering wheel. The driver may maintain control of the vehicle brake, and the vehicle signals 210 may remain active.

Figure 5D:
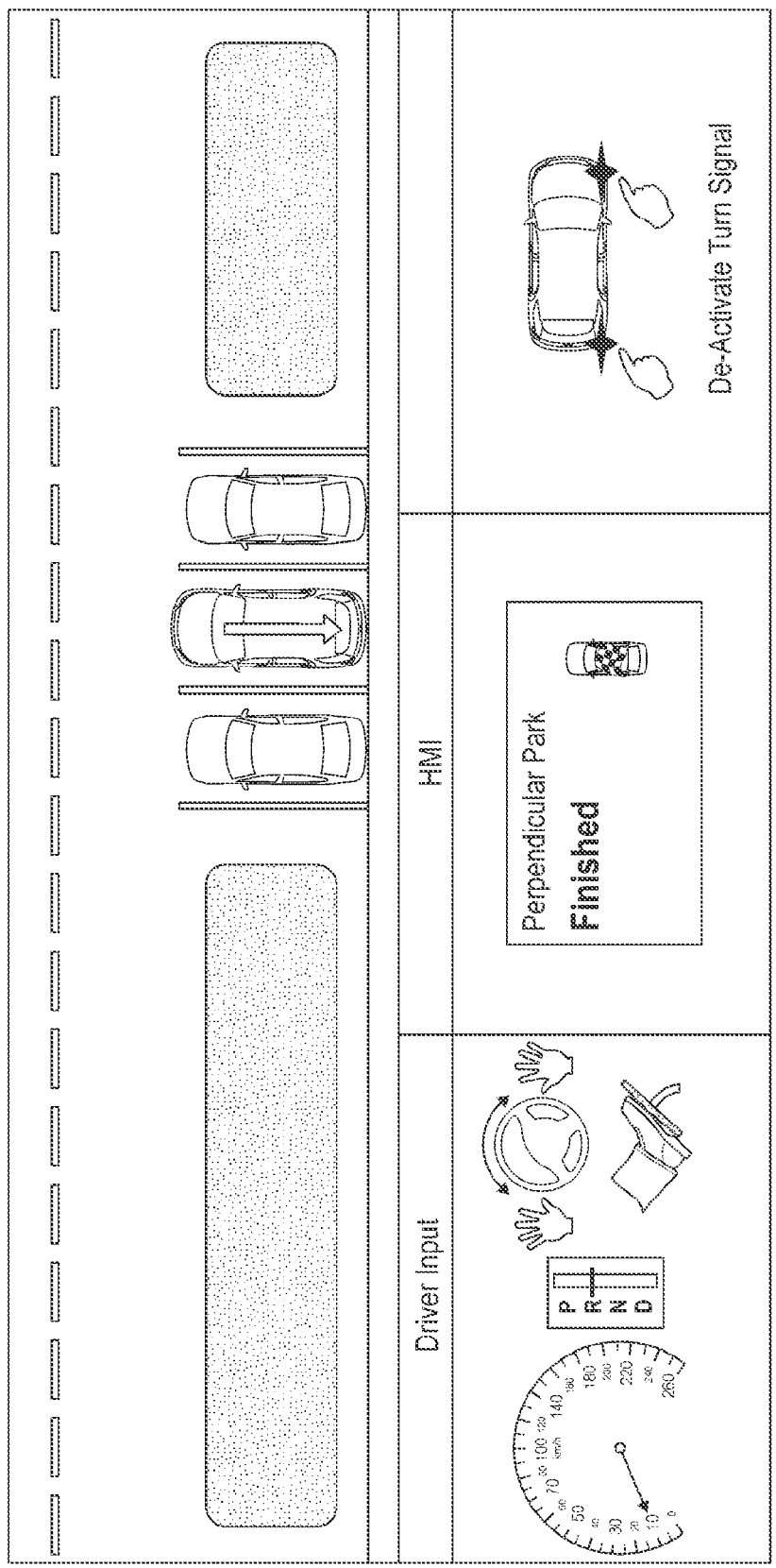

Referring to FIG. 5D, once the vehicle 102 is mostly within the parking place, that is, at least a portion of the vehicle is within the parking place, the controller 204 may deactivate the signals 210. The controller may deactivate the signals 210 in response to a cease signal trigger event such as the vehicle 102 coming to a complete stop during the active park assist, and the vehicle shifting to park during the active park assist, among others.

Figure 6:
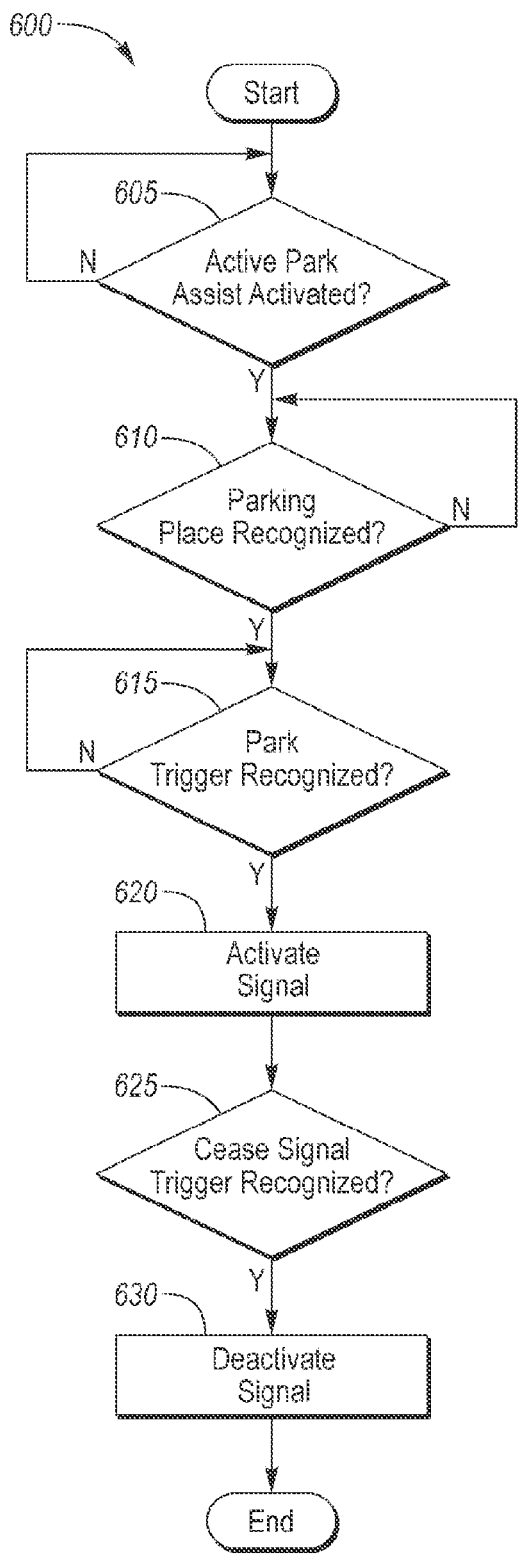
FIG. 6 illustrates an example process for the park assist system.

FIG. 6 illustrates an example process 600 for the park assist system 200 for active park assist features. The process 600 may be implemented for either or both of the SAPP and PPA features. The process 600 may begin at block 605 where the controller 204 may determine whether the park assist features have been activated. The driver may activate the active park assist features via the vehicle display 138, mobile device 152, etc. If the active park assist has been activated, the process 600 proceeds to block 610.

At block 610, during the active park assist search, the controller 204 may determine whether an available parking place has been recognized. As explained, the parking place may be recognized as an available parking place via the sensors 202. Once an available parking place has been recognized, the process proceeds to block 615.

At block 615, the controller 204 waits until a park trigger is recognized. A park trigger, as explained, may be a depression of the vehicle brake after passing the available parking place. Once a park trigger is recognized, indicating that the vehicle 102 is to use the active park assist features to park in the recognized parking place, the process 600 proceeds to block 620.

At block 620, the controller 204 may activate the signals 210 in an effort to alert other drivers as to the vehicle's intent (i.e., parking in the available parking place).

At block 625, the controller 204 may wait until a cease signal trigger is recognized. As explained above, a cease signal trigger may include a stopping of the vehicle, a shift forward of the vehicle (e.g., changing from reverse to drive), etc. The cease signal trigger may indicate that the vehicle is predominately finished parking. Once a cease signal trigger is recognized, the process 600 proceeds to block 630.

At block 630, the controller 204, in response to recognizing the cease signal trigger, may deactivate the signals 210 at least because the parking is predominately complete, and the advantage of alerting other drivers as to the vehicle's intent may provide little benefit once the vehicle 102 is parked. The process may then end.

Figure 7:
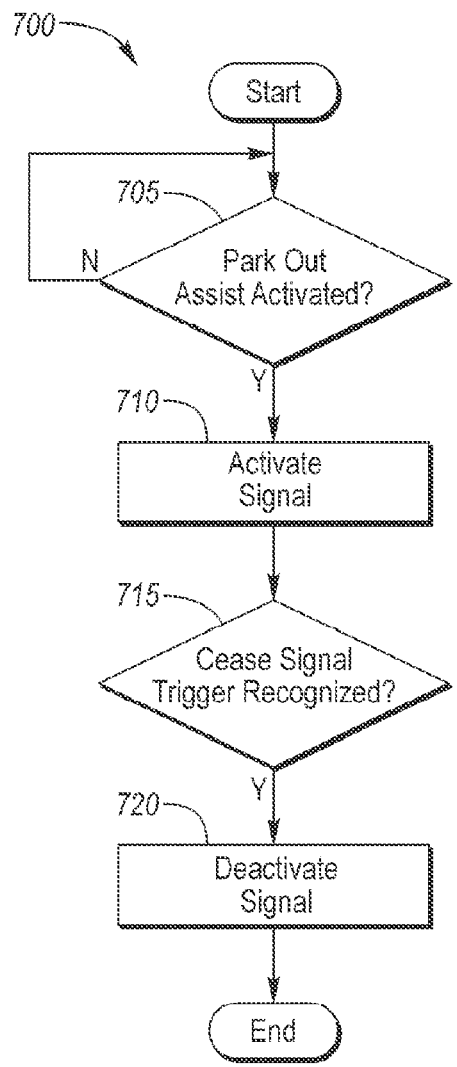
FIG. 7 illustrates another example process for the park assist system.

FIG. 7 illustrates an example process 700 for the park assist system 200 for the park out assist (POA) feature. The process 700 may begin at block 705 where the controller 204 may determine whether the park out assist feature has been activated. If so, the process 700 proceeds to block 710.

At block 710, the controller 204 may activate the signals 210 in an effort to alert other drivers as to the vehicle's intent (i.e., pulling out of the parking place).

At block 715, the controller 204 may wait until a cease signal trigger is recognized. As explained above, a cease signal trigger may include a certain distance being traveled by the vehicle. This may include the vehicle traveling 10 yards so as to substantially clear the parking place. Once the cease signal trigger is recognized, the process 700 proceeds to block 720.

At block 720, the controller 204 in response to recognizing the cease signal trigger, may deactivate the signals 210 at least because the park out assist is predominately complete, and the advantage of alerting other drivers as to the vehicle's intent may provide little benefit once the vehicle 102 has left the parking place. The process may then end.

Accordingly, a system for activating and deactivating a signal (e.g., a blinker) during certain park assist features is described herein. Upon realizing at least one cease signal trigger, the vehicle blinkers may be deactivated without additional user interaction.

Computing devices, such as the computing platform, processors, controllers, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included with in a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.) stored on computer readable media associated there with (e.g., disks, memories, etc.). A computer program product may comprise such instructions stored in computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle park assist system, comprising
a sensor,
a blinker, and
a controller configured to locate via the sensor an available parking place and activate the blinker in response to locating the available parking place and recognizing a park trigger indicative of a desire to park in the available parking place upon passing the available parking place.

2. The system of claim 1, wherein the park trigger includes a deceleration of the vehicle upon passing the available parking place.

3. The system of claim 1, wherein the park trigger includes a depression of a vehicle brake upon passing the available parking place.

4. The system of claim 1, wherein the park trigger is included in vehicle component data received from at least one vehicle control unit.

5. The system of claim 4, wherein the vehicle component data includes at least one of a vehicle speed and vehicle gear.

6. The system of claim 1, wherein the controller is further configured to enter into an active park assist mode.

7. The system of claim 1, wherein the blinker includes a plurality of blinkers, at least one on each side of a vehicle.

8. The system of claim 7, wherein the controller is further configured to activate at least one of the plurality of blinkers arranged on the side of the vehicle adjacent to the available parking place.

9. A vehicle park assist system, comprising
a sensor,
a blinker, and
a controller configured to activate the blinker during park assist and deactivate the blinker in response to receiving vehicle component data including a cease signal trigger indicative of the park assist being substantially complete and including at least one of a vehicle wheel alignment and vehicle gear.

10. The system of claim 9, wherein the cease signal trigger includes a straight wheel alignment.

11. The system of claim 9, wherein the cease signal trigger includes the vehicle gear being in park.

12. The system of claim 9, wherein the cease signal trigger includes the vehicle gear transitioning from reverse to drive.

13. A vehicle park assist system, comprising
at least one sensor,
at least one signal device on each side of a vehicle, and
a controller configured to
  locate, via the sensor, an available parking place,
  activate, in response to locating the available parking place and recognizing a park trigger indicative of a desire to park in the available parking place upon passing the available parking place, the signal device, and
  deactivate the signal device in response to receiving vehicle component data indicative of a least one cease signal trigger.

14. The system of claim 13, wherein the vehicle component data includes at least one of a vehicle wheel alignment and vehicle gear.

15. The system of claim 14, wherein the cease signal trigger includes a straight wheel alignment.

16. The system of claim 14, wherein the cease signal trigger includes the vehicle gear being in park.

17. The system of claim 13, wherein the vehicle component data includes at least one of a vehicle speed and vehicle gear.

18. The system of claim 17, wherein the park trigger includes a deceleration of the vehicle upon passing the available parking place.

19. The system of claim 17, wherein the park trigger includes a depression of a vehicle brake upon passing the available parking place.

20. The system of claim 13, wherein the controller is further configured to activate the signal device on the side of the vehicle adjacent to the available parking place.

* * * * *